(12) United States Patent
Miyata et al.

(10) Patent No.: US 6,598,719 B2
(45) Date of Patent: Jul. 29, 2003

(54) ONE-WAY CLUTCH

(75) Inventors: Hirofumi Miyata, Kobe (JP);
Shinichiro Nishikawa, Kobe (JP);
Yoshihiro Akahoshi, Kobe (JP)

(73) Assignee: Bando Chemical Industries, Ltd., Hyogo (JP)

( * ) Notice: Subject to any disclaimer, the term of this patent is extended or adjusted under 35 U.S.C. 154(b) by 0 days.

(21) Appl. No.: 09/987,343

(22) Filed: Nov. 14, 2001

(65) Prior Publication Data

US 2002/0063028 A1 May 30, 2002

(30) Foreign Application Priority Data

Nov. 24, 2000 (JP) .......................... 2000-358204

(51) Int. Cl.[7] .......................... F16D 13/06; F16D 41/20
(52) U.S. Cl. ...................... 192/41 R; 192/80
(58) Field of Search ................. 192/41 R, 80, 192/112; 384/191.2, 282, 417, 439; 474/140

(56) References Cited

U.S. PATENT DOCUMENTS

| 157,660 A | * | 12/1874 | Weston ........................ 192/80 |
| 157,662 A | * | 12/1874 | Weston ........................ 192/80 |
| 484,308 A | * | 10/1892 | Fitzgerald ..................... 192/80 |
| 2,376,406 A | * | 5/1945 | Weingart ..................... 384/439 |
| 2,425,209 A | * | 8/1947 | Snyder et al. ............... 277/405 |
| 2,908,180 A | * | 10/1959 | Swenson ................... 74/421 A |
| 3,704,048 A | * | 11/1972 | Yoshikawa et al. ......... 384/439 |
| 5,461,950 A | * | 10/1995 | Iwinski .......................... 81/61 |
| 5,675,202 A | * | 10/1997 | Zenmei et al. ................ 192/45 |
| 5,842,547 A | * | 12/1998 | Carlson et al. ............. 188/267 |
| 5,878,855 A | * | 3/1999 | Miyata ..................... 192/41 R |
| 6,024,196 A | * | 2/2000 | Miyata ..................... 192/41 R |
| 6,035,985 A | * | 3/2000 | Miyata ..................... 192/41 R |

FOREIGN PATENT DOCUMENTS

JP            2869062      12/1998

* cited by examiner

*Primary Examiner*—Rodney H. Bonck
(74) *Attorney, Agent, or Firm*—Nixon Peabody LLP; Thomas W. Cole (57) ABSTRACT

A belt-type one-way clutch is arranged so that a case is assembled with a flat pulley so as to rotate around the central axis of the flat pulley, and that a flat belt is looped between a working surface of a rocking member supported for rocking motion by a shaft member held at both ends in shaft bores of the case and a working surface of the flat pulley, and that the rocking plate biased from a leaf spring presses one span of the flat belt to place an initial tension on the flat belt. Both the ends of the shaft member are held in the shaft bores of the case via respective bushes to suppress stress. Accordingly, larger torque can be transmitted despite use of aluminum alloy as material of the case.

6 Claims, 9 Drawing Sheets

ONE-WAY CLUTCH

FIELD OF THE INVENTION

This invention relates to a one-way clutch of simple construction and low cost for which no high precision is required.

DESCRIPTION OF THE PRIOR ART

As for example disclosed in Japanese Unexamined Patent Publication No. 2869062, there is known a simple one-way clutch for low torque transmission in which is applied the principle of a two-shaft belt power transmission mechanism for transmitting torque between two shafts by way of a belt looped therebetween.

This clutch includes a first rotation member of flat pulley shape that is coupled to either one of the drive and driven sides, and a second rotation member that is assembled rotatably with the first rotation member and coupled to the other of the drive and driven sides. Radially outside of the first rotation member is disposed a shaft member which is in parallel with the rotation axis of both the rotation members, and both ends of the shaft member are pressed into corresponding shaft bores provided in the second rotation member, respectively. A rocking member of substantially arcuate cross section is supported for rocking motion on the shaft member. A belt is looped between the outer periphery of the rocking member and the outer periphery of the first rotation member so that it creates two spans therebetween. On the other hand, attached to the second rotation member is a biasing means for tending to radially inwardly press one end of the rocking member in a circumferential direction thereof, whereby the other end of the rocking member in the circumferential direction radially outwardly presses one span of the belt to place an initial tension on the belt.

When torque is input to the clutch in a direction to relatively rotate both the rotation members such that the span pressed by the biasing means will provide a slack-side span, the belt tension is maintained or increased and therefore the torque is transmitted between the first and second rotation members via the belt. In contrast, when torque is input to the clutch in a direction to relatively rotate both the rotation members such that the span pressed by the biasing means will provide a tight-side span, the belt tension is reduced so that the belt slips on at least one of the outer peripheries of both the rocking member and the first rotation member, which blocks torque transmission.

While a typical conventional one-way clutch is a precision machinery component in which a plurality of intermediate members are arranged for establishing and blocking torque transmission between inner and outer rings and a spring member is provided for urging each of the intermediate members in a direction to allow for torque transmission, the belt-type one-way clutch as described above needs no highly precise parts and has a simplified construction. Therefore, the belt-type one-way clutch has the advantage of being manufactured at low cost.

Further, when excessively large torque is input to the clutch, the belt can be broken to block further torque transmission. This also offers the advantage of low cost in that there is no need for the clutch to additionally include a torque limiter. In addition, the belt-type one-way clutch is also economically advantageous in that even if the belt has been broken, the clutch can be used again by replacing the broken belt with new one.

Meanwhile, since the belt-type one-way clutch originally has a simpler construction as compared with the typical one-way clutch, it can only necessarily transmit relatively small torque. In terms of its use, however, there is a strong demand for such a clutch that transmits as large torque as possible even if it is for low torque transmission.

In order to increase the magnitude of transmittable torque of the belt-type one-way clutch, the following several measures have been required:

1) to enhance the tensile strength of the belt;
2) to enhance the strength of the rocking member receiving pressure due to a belt tension with a smaller area than the first rotation member; and
3) to enhance the strength of the shaft member which supports the rocking member thereon.

Further, as a user side demand, weight reduction is also strongly needed in addition to rise in transmittable torque magnitude. In this respect, making the second rotation member from aluminum alloy has yet been taken as a measure.

Problem to be Solved

However, the above-described one-way clutch has a problem in that load placed on the shaft member is concentrated at the shaft bores of the second rotation member in which both ends of the shaft member are held so that excessively large stress will be produced at the shaft bores.

In particular, if the second rotation member is made from aluminum alloy for weight reduction, the problem resulting from excessively large stress will outstandingly appear.

In view of the foregoing problem, a primary object of the present invention is to provide a belt-type one-way clutch which applies the principle of a two-shaft belt power transmission mechanism and which can increase the magnitude of transmittable torque while avoiding constraints placed due to the use of aluminum alloy as material of the second rotation member for its weight reduction by suppressing stress produced due to load of the shaft member being concentrated at shaft bores of the second rotation member which held respective ends of the shaft member in order to increase the magnitude of transmittable torque.

SUMMARY OF THE INVENTION

To solve the foregoing problem, the present invention takes the following solutions.

A first solution of the invention is a one-way clutch comprising: a first rotation member that has a working surface of circular cross section formed in an outer periphery thereof and is coupled to one of drive and driven sides; a second rotation member that is assembled with the first rotation member so as to rotate around the central axis of the working surface of the first rotation member and is coupled to the other of the drive and driven sides; a shaft member that is disposed radially outside of the working surface of the first rotation member to extend in parallel with the central axis of the working surface and is held at both ends thereof by the second rotation member; a rocking member that is placed radially outside of the working surface of the first rotation member, has a working surface of arcuate cross section formed in an outer periphery thereof and is supported for rocking motion on the shaft member; a friction member that is looped between both the working surfaces of the first rotation member and the rocking member to create two spans between the first rotation member and the rocking member; and a biasing member for tending to rotate the rocking member around the axis of the shaft member so that the rocking member presses one of the spans of the friction member, wherein both the ends of the shaft member are held by the second rotation member through respective support members that each cover side and end surfaces or at least the side surface of the corresponding end of the shaft member.

According to this solution, when the tension of the friction member is increased due to torque input to the one-way clutch, the load placed on the rocking member will be correspondingly increased and concentrated at holding portions of the second rotation member which hold both the ends of the shaft member. In this case, each of the support members, which is interposed between the corresponding end of the shaft member and the corresponding holding portion of the second rotation member, disperses the load so that stress produced within the holding portion of the second rotation member due to the load concentration can be suppressed to a low level. This avoids the situation that the stress as described above deforms the holding portion of the second rotation member to involve a mal-operation of the one-way clutch.

A second solution of the invention is based on the first solution, wherein the second rotation member is made from aluminum alloy. According to this solution, the second rotation member made from aluminum alloy can be reduced in weight as compared with the conventional second rotation member made from steel for example. Further, in the case of using the second rotation member made from aluminum alloy poorer in strength than the steel-made one, the support members can particularly effectively obviate deformation of the holding portion of the second rotation member.

A third solution of the invention is based on the first solution, wherein the second rotation member has shaft bores for respectively holding both the ends of the shaft member, and the support members are pressed into the respective shaft bores. Further, a fourth solution of the invention is based on the first solution, wherein the second rotation member is made by die casting, and the support members are insert molded in the second rotation member. In these manners, the effects of the first solution can be specifically implemented.

A fifth solution of the invention is based on the fourth solution, wherein the second rotation member is formed of a first half placed on one side in an axial direction with respect to an imaginary plane which is in the middle of the shaft member and orthogonal to the shaft member, and a second half placed on the other side in the axial direction with respect to the imaginary plane and molded using the same die as used for the first half.

According to this solution, the second rotation member is constituted by two halves bonded in its axial direction and the two halves are molded using the same die. Therefore, the cost for molding of the second rotation member can be reduced as compared with the case of using different dies to mold two halves.

A sixth solution of the invention is based on the first solution, wherein the rocking member is made by forging. In this manner, the forged rocking member has higher strength than that of other rocking members made by casting for example, which contributes to transmission of larger torque of the one-way clutch and enhances durability thereof.

A seventh solution of the invention is based on the first solution, wherein the working surface of the first rotation member is machined.

According to this solution, since machining treatment is applied to the working surface of the first rotation member, the frictional force developed between the first rotation member and the friction member can be suppressed to a low level. This provides smooth sliding between the working surface of the first rotation member and the friction member and suppresses abrasion of the friction member by a reduction of the frictional force.

Effects of the Invention

In the first solution of the present invention, the one-way clutch is arranged so that the second rotation member is rotatably assembled with the first rotation member, the friction member is looped between the working surface of the rocking member supported for rocking motion by the shaft member held at both ends by the second rotation member and the working surface of the first rotation member, and the rocking member biased by the biasing member presses one span of the friction member to place an initial tension on the friction member, wherein both the ends of the shaft member are held by the second rotation member through the support members that each cover at least the side surface of the corresponding end of the shaft member. Therefore, load of the shaft member which would be concentrated at the holding portions of the second rotation member which hold both the ends of the shaft member is dispersed so that stress produced within the holding portions can be suppressed to a low level. This increases the magnitude of transmittable torque while avoiding constraints placed on the one-way clutch by reducing the weight of the second rotation member through replacement of material used.

According to the second solution of the invention, since the second rotation member is made from aluminum alloy, the second rotation member can be reduced in weight and concurrently the effects of the first solution can be obtained to a full extent.

According to the third solution of the invention, when the second rotation member has shaft bores for respectively holding both the ends of the shaft member, the support members as described above are pressed into the shaft bores, respectively. Therefore, the effects of the first solution can properly be obtained.

According to the fourth solution of the invention, when the second rotation member is made by die casting, the support members are insert molded in the second rotation member. Therefore, the same effects as exhibited by the third solution can be obtained.

According to the fifth solution of the invention, since the second rotation member is formed of a first half placed on one side with respect to its axial direction and a second half which is placed on the other side and molded using the same die as used for the first half, i.e., these two halves are formed using the same die, the cost for molding of the second rotation member can be reduced.

According to the sixth solution of the invention, since the rocking member is made by forging, its strength can be enhanced, which contributes to transmission of larger torque and enhancement in durability of the one-way clutch.

According to the seventh solution of the invention, since the working surface of the first rotation member is machined, the frictional force between the working surface of the first rotation member and the friction member can be reduced. This provides smooth blockage of torque transmission due to slide between the working surface of the first rotation member and the friction member and suppresses abrasion of the friction member that may be induced by such slide.

DESCRIPTION OF THE PREFERRED EMBODIMENTS

Hereinafter, embodiments of the present invention will be described in detail with reference to the drawings.

Figure 1:
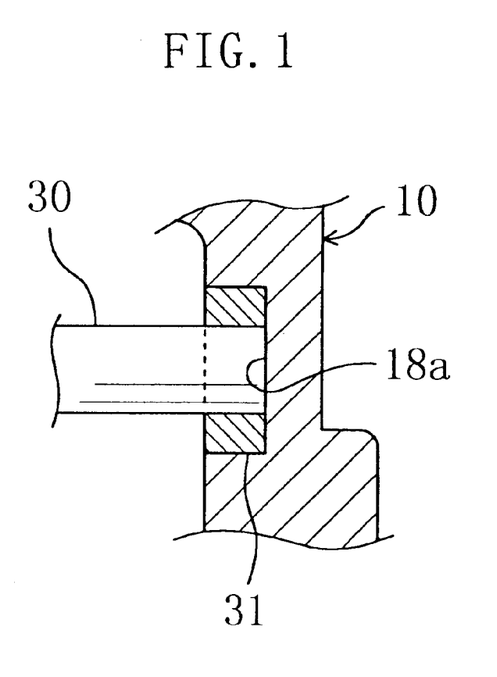
FIG. 1 is an enlarged cross-sectional view showing a necessary part of a one-way clutch according to an embodiment of the present invention.
Figure 2:
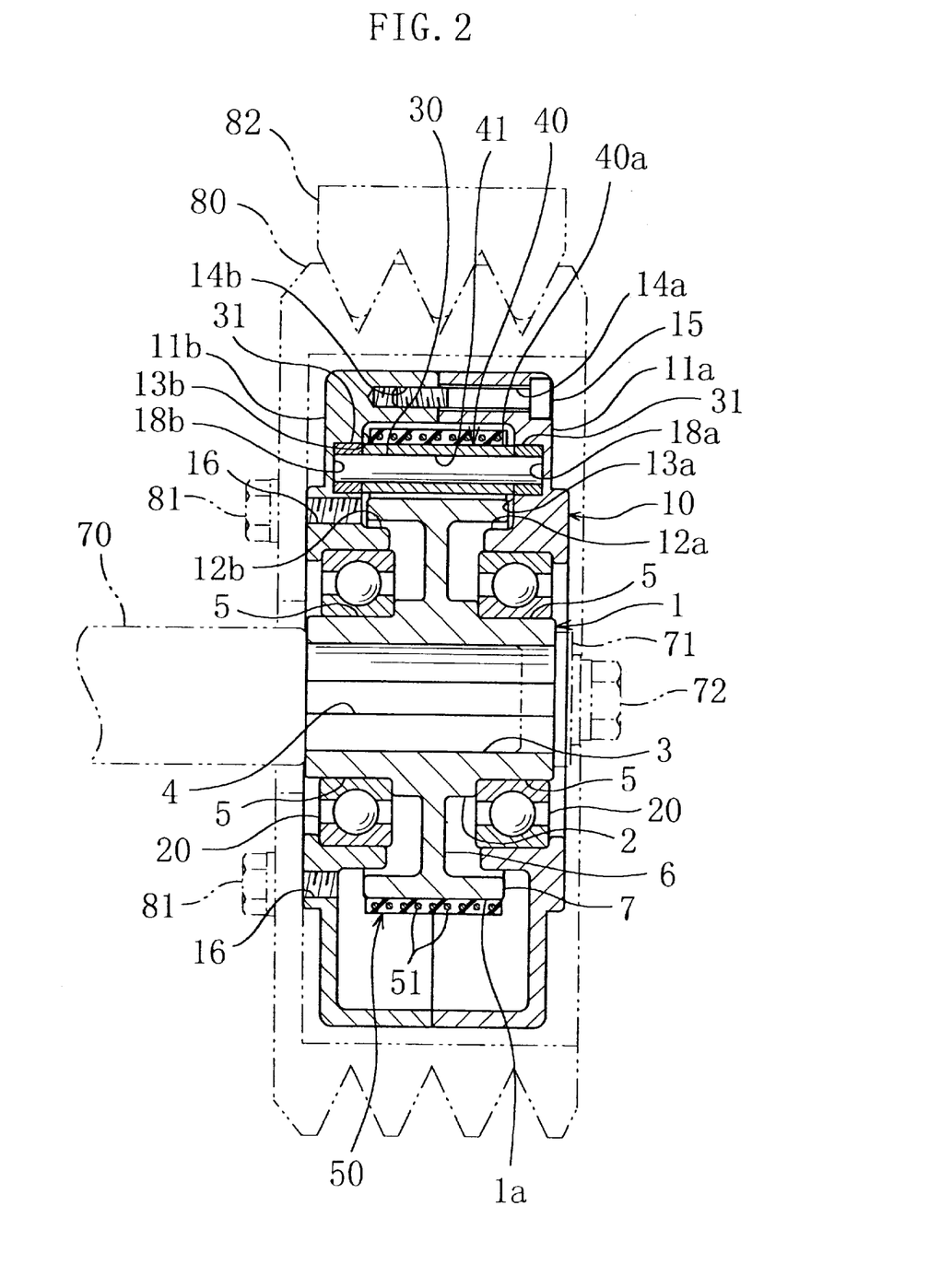
FIG. 2 is a cross-sectional view taken along the line II—II of FIG. 3.
Figure 3:
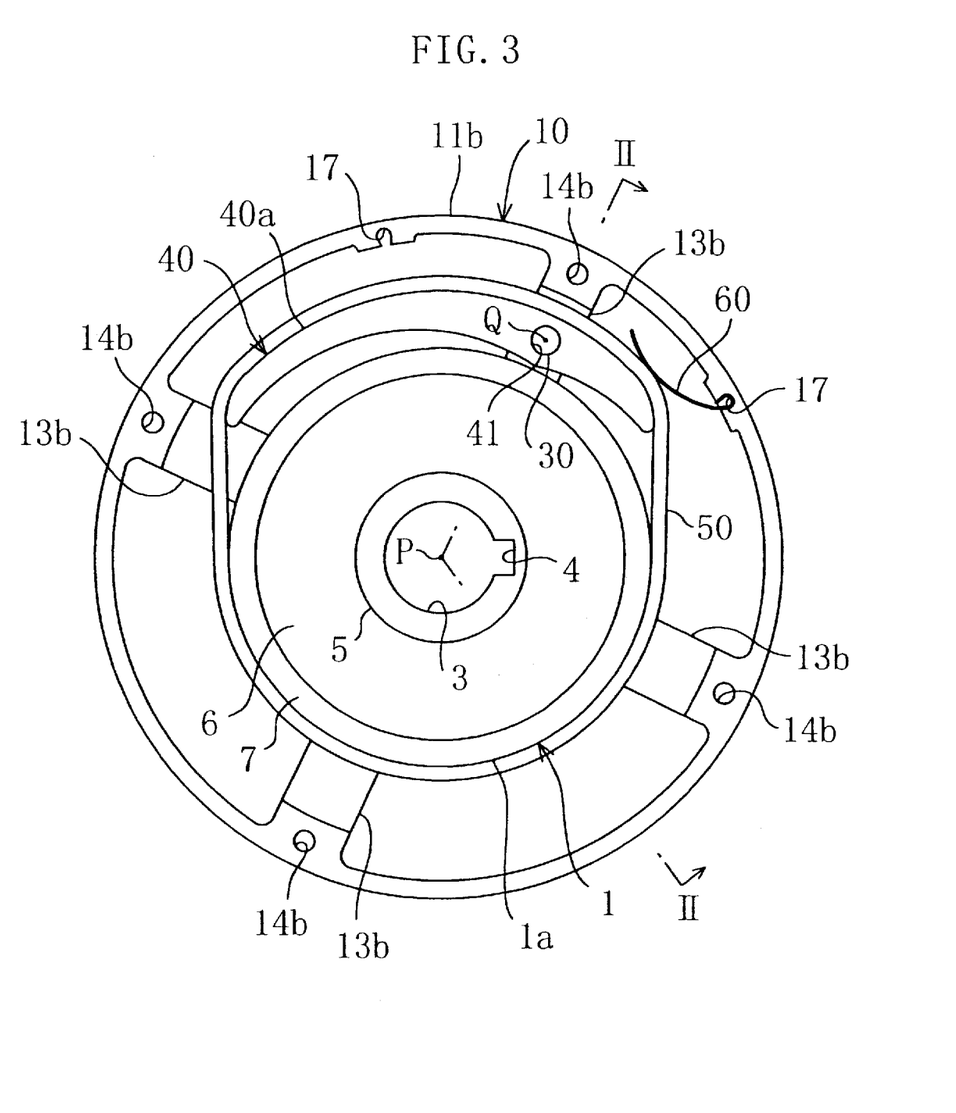
FIG. 3 is a view seen from the side opposite to a drive shaft when one half of a second rotation member is removed from the other.

FIGS. 2 and 3 show the overall structure of a one-way clutch according to an embodiment of the present invention. For example, in a vehicle equipped with a power take-off, the one-way clutch is used so as to be disposed at an output end of the power take-off. Alternatively, in a rice transplanter as an agricultural machine, the one-way clutch is used so as to be disposed at an input end of a planting mechanism for planting rice seedlings. Alternatively, in a combine harvester, the one-way clutch is used so as to be disposed at an input end of a harvesting mechanism for harvesting rice.

The one-way clutch includes a flat pulley 1 as a first rotation member having a working surface 1a of circular cross section formed in its outer periphery, and a case 10 as a second rotation member assembled with the flat pulley 1 so as to rotate about the central axis P of the flat pulley 1. The flat pulley 1 is coupled coaxially to a drive side output shaft 70. On the other hand, the case 10 is coupled to a V-ribbed pulley 80 for unitary rotation, and transmits torque from drive to driven side by way of a V-ribbed belt 82 entrained over the V-ribbed pulley 80.

The flat pulley 1 is coupled at its boss 2 to the output shaft 70. Specifically, the boss 2 is provided with a coupling hole 3 which passes through the boss 2 in an axial direction of the boss to insert the output shaft 70 therein. The inner periphery of the coupling hole 3 is formed with a groove 4 in which the flat pulley 1 is keyed to the output shaft 70. The flat pulley 1 is provided with a disk portion 6 which extends radially outward from the axially midpoint of the outer periphery of the boss 2. At the peripheral edge of the disk portion 6, a cylindrical portion 7 is provided to cover the disk portion 6 from the outer peripheral side. The outer periphery of the cylindrical portion 7 constitutes the working surface 1a as described above. Both axially outer end portions of the boss 2 are formed into seats 5, 5 smaller in diameter than the outer periphery of an axially middle portion of the boss 2. Bearings 20 and 20 for assembling the case 10 with the flat pulley 1 to allow relative rotation of both the members 1 and 10 are connected to the flat pulley 1 to allow their inner rings to unitarily rotate with the flat pulley 1 in such a manner that the inner rings are fitted on the seats 5 and 5, respectively.

Figure 4:
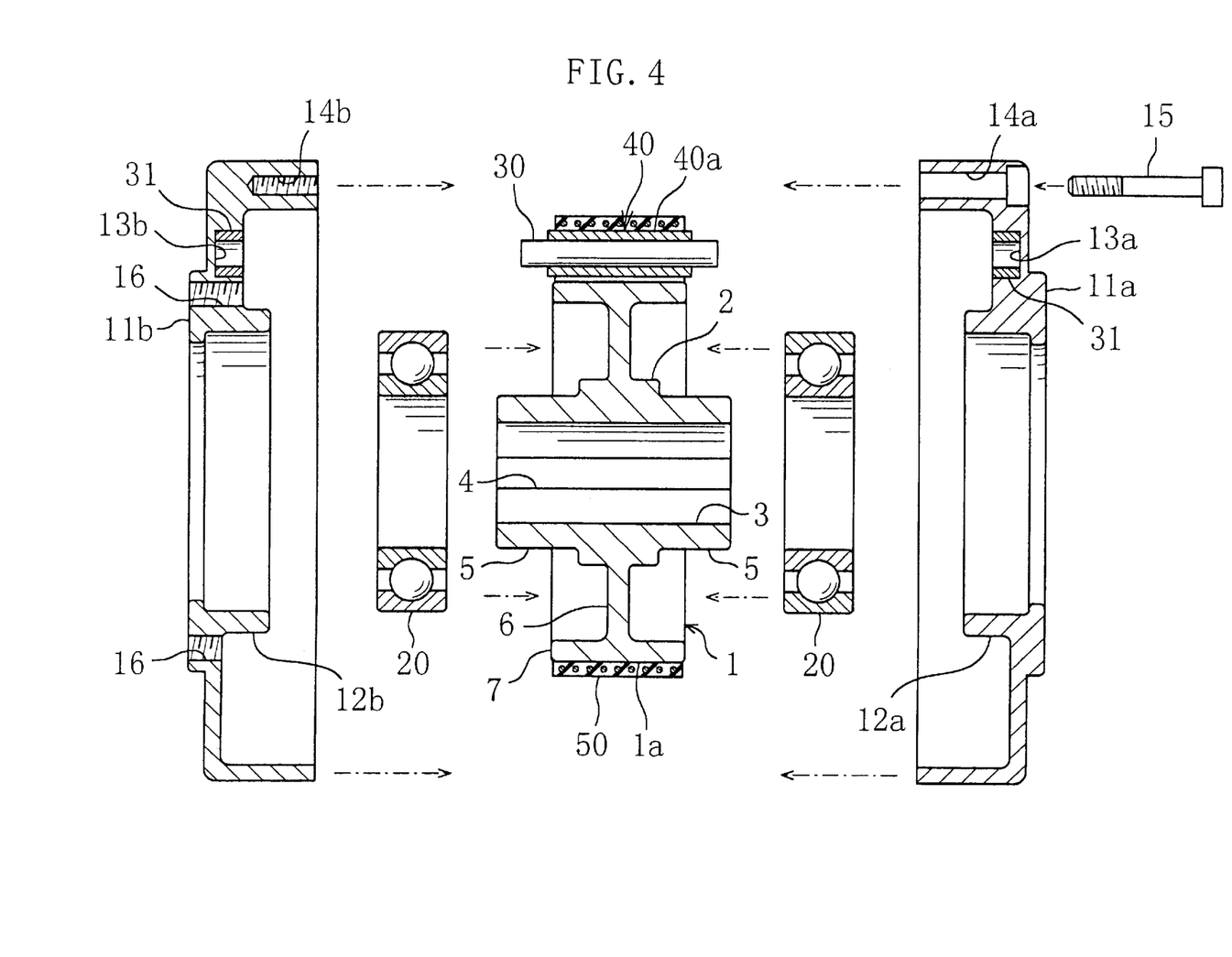
FIG. 4 is a disassembled cross-sectional view of the one-way clutch.

As shown in FIG. 4, the case 10 is composed of a first half 11a located on one side in the axial direction (the right side of FIG. 2) with respect to an imaginary plane which is at the axially middle point of the flat pulley 1 and orthogonal to the axis of the flat pulley 1, and a second half 11b located on the other side in the axial direction (the left side of FIG. 2), which are in correspondence with the bearings 20 and 20. The case 10 is formed in such a manner that the first and second halves 11a and 11b are bonded in the axial direction. These halves 11a and 11b are molded in the same shape using the same die. Both the halves 11a and 11b are provided at their inner peripheral sides with axially arranged bosses 12a and 12b which are fitted on outer rings of the bearings 20 and 20, respectively. Both the bosses 12a and 12b are bonded so as to be fitted on the corresponding outer rings for unitary rotation. Further, in each of the inner surfaces of the axially orthogonal flat portions of the halves 11a and 11b, four thickened reinforcing beads 13a and 13b are offset circumferentially from each other by 90 degrees and formed to extend radially outwardly from the corresponding bosses 12a and 12b and then extend axially toward the opposed halves 11b and 11a. The end surfaces of the axially extending portions (outer peripheral side end portions) of the beads 13a and 13b located on the outer peripheral side of the halves 11a and 11b are formed into axially orthogonal flat surfaces, respectively.

The axially extending portion of each bead 13a of the first half 11a is formed with a bolt hole 14a axially passing through that portion, while an inner end surface of the axially extending portion of each bead 13b of the second half 11b is formed with an internally threaded hole 14b which axially extends. Four bolts 15, 15, . . . are inserted into the four bolt holes 14a, 14a, . . . of the first half 11a, respectively, and screwed at their distal end portions into the threaded holes 14b, 14b, . . . of the second half 11b, respectively. In this manner, the first and second halves 11a and 11b are bonded in one piece.

One bead 13a, 13b for each half 11a, 11b of the case 11 is formed with a shaft bore 18a, 18b for holding each end of a shaft member as described later. These two shaft bores 18a and 18b are arranged in an axially aligned manner. Further, the inner periphery of a circumferential wall of the case 10 is provided with two anchoring parts 17, to either one of which a leaf spring is anchored as described later, in such a manner that they are offset circumferentially oppositely with respect to the shaft bores 18a and 18b by equal degrees.

Radially outside of the working surface 1a of the flat pulley 1 is disposed a shaft member 30 which extends in parallel with the axis P of the flat pulley 1. Specifically, the shaft member 30 is disposed so that its axis Q (see FIG. 3) is in parallel with the axis P of the flat pulley 1. Both ends of the shaft member 30 are held in the shaft bores 18a and 18b of the case 10, respectively. The shaft member 30 thereby rotates in unitary relation together with the case 10.

A rocking plate (rocking member) 40 made by forging is supported to the shaft member 30 for rocking motion on the axis Q. The rocking plate 40 is placed radially outside of the working surface 1a of the flat pulley 1 and also has a working surface 40a of arcuate cross section formed in its outer periphery. Specifically, an axially extending through hole 41 is formed at a position of the rocking plate 40 offset toward one end thereof (the right end in FIG. 3) with respect to its circumferentially middle point. The shaft member 30 is inserted into the through hole 41 to support the rocking plate 40.

A flat belt 50 as a friction member is looped between the working surface 1a of the flat pulley 1 and the working surface 40a of the rocking plate 40 to create two spans between the flat pulley 1 and the rocking plate 40. This flat belt 50 is made from rubber, and formed in such a manner that a cord 51 is internally embedded and an unshown fabric layer is provided in its inner periphery.

In the vicinity of the shaft member 30, a leaf spring 60 as a biasing member is disposed. This leaf spring 60 is formed substantially in an arcuate cross section and anchored at one end thereof to one of the anchoring parts 17 of the case 10. The other end portion of the leaf spring 60 is set to radially inwardly bias one side portion of the rocking plate 40 (the right side portion in FIG. 3) via the flat belt 50. Thereby, the other side portion of the rocking plate 40 (the left side portion in FIG. 3) radially outwardly presses the left-hand span in FIG. 3 to place an initial tension on the flat belt 50. It is to be noted that the "initial tension" termed herein means a tension as large as it ensures a frictional force at a predetermined value or more between the working surface 1a of the flat pulley 1 and the working surface 40a of the rocking plate 40 to allow torque transmission between the flat pulley 1 and the case 10.

Behavior of the one-way clutch with the above construction will be described with reference to FIGS. 5 and 6.

Figure 5:
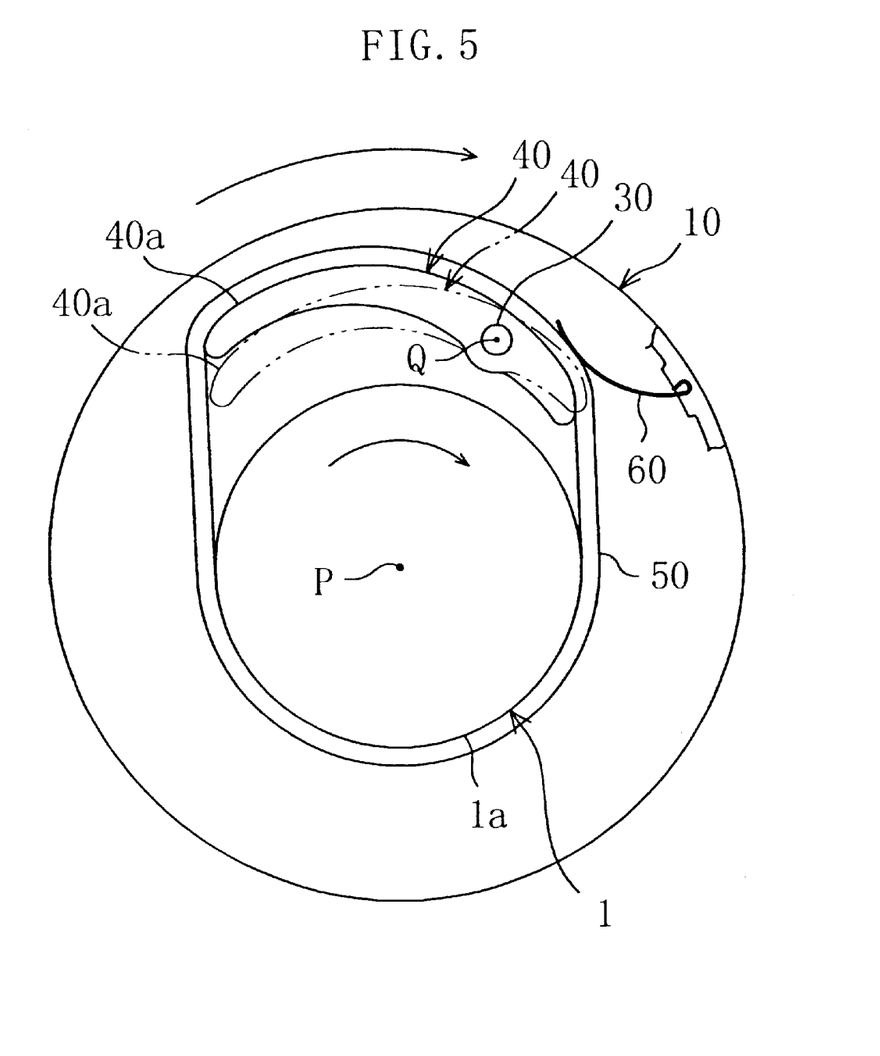
FIG. 5 is a schematic view of the one-way clutch when torque in a direction to transmit it is input to a first rotation member.

First, when the drive side output shaft 70 rotates clockwise in FIG. 5 relative to the driven side so that the flat pulley 1 relatively rotates in a clockwise direction as shown in the arrow in FIG. 5, an initial tension placed on the flat belt 50 ensures respective predetermined frictional forces between the flat belt 50 and the working surface 1a of the flat pulley 1 and between the flat belt 50 and the working surface 40a of the rocking plate 40. Therefore, the right-hand span of the flat belt 50 in FIG. 5 is pulled toward the flat pulley 1 with rotation of the flat pulley 1, and the rocking plate 40 rocks clockwise about the axis Q of the shaft member 30. As a result, the right-hand span becomes a tight-side span. At the time, the other side portion (left side portion in FIG. 5) of the rocking plate 40 radially outwardly presses the left-hand span of the flat belt 50, i.e., the slack-side span thereof. Therefore, this slack-side span will be more strongly pressed as compared with the condition where it is pressed by the spring force of the leaf spring 60 alone. Accordingly, in this case, the tension of the flat belt 50 is increased over the initial tension, which provides torque transmission from the flat pulley 1 to the case 10 via the flat belt 50.

Figure 6:
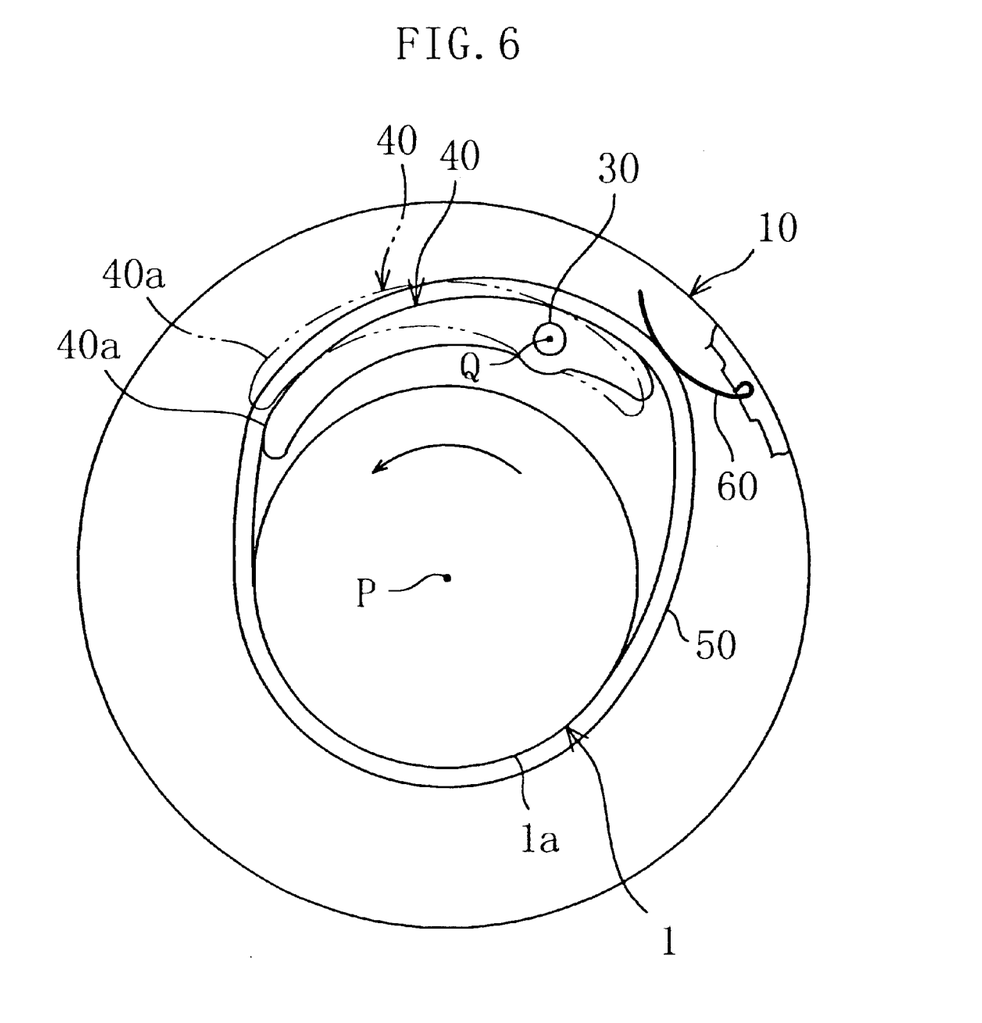
FIG. 6 is a corresponding view of FIG. 5 when torque in a direction to block torque transmission is input to the first rotation member.

On the contrary, when the drive side output shaft 70 rotates counterclockwise in FIG. 6 relative to the driven side so that the flat pulley 1 relatively rotates in a counterclockwise direction as shown in the arrow in FIG. 6, an initial tension still placed on the flat belt 50 ensures respective predetermined frictional forces between the flat belt 50 and the working surface 1a of the flat pulley 1 and between the flat belt 50 and the working surface 40a of the rocking plate 40. Therefore, the left-hand span of the flat belt 50 in FIG. 6 is pulled toward the flat pulley 1 with rotation of the flat pulley 1, and the rocking plate 40 rocks counterclockwise about the axis Q of the shaft member 30. As a result, unlike the above case, the left-hand span becomes a tight-side span while the right-hand span becomes a slack-side span. Thereby, the other side portion (left side portion in FIG. 6) of the rocking plate 40 radially inwardly shifts against the spring force of the leaf spring 60. Therefore, the left-had span of the flat belt 50, i.e., the tight-side span thereof, is reduced in tension. At the time, the one side portion (right side portion in FIG. 6) of the rocking plate 40 radially outwardly shifts. The slack-side span is correspondingly pressed. However, since the one side portion of the rocking plate 40 is shorter than the other side portion, the tension of the slack-side span will not be increased. Accordingly, in this case, the tension of the flat belt 50 is decreased to less than the initial tension, which blocks torque transmission from the flat plate 1 to the case 10 through the flat belt 50.

As can be seen from the above description, when the one-way clutch inputs, from the drive side, torque in such a direction (in a clockwise direction in FIG. 5) that the span pressed by the spring force of the leaf spring 60 becomes a slack-side span as shown in FIG. 5, it outputs the torque to the driven side. On the other hand, when the one-way clutch inputs, from the drive side, torque in such a direction (in a clockwise direction in FIG. 6) that the span pressed by the spring force of the leaf spring 60 becomes a tight-side span as shown in FIG. 6, is blocks torque transmission to stop the torque output to the driven side.

Figure 7:
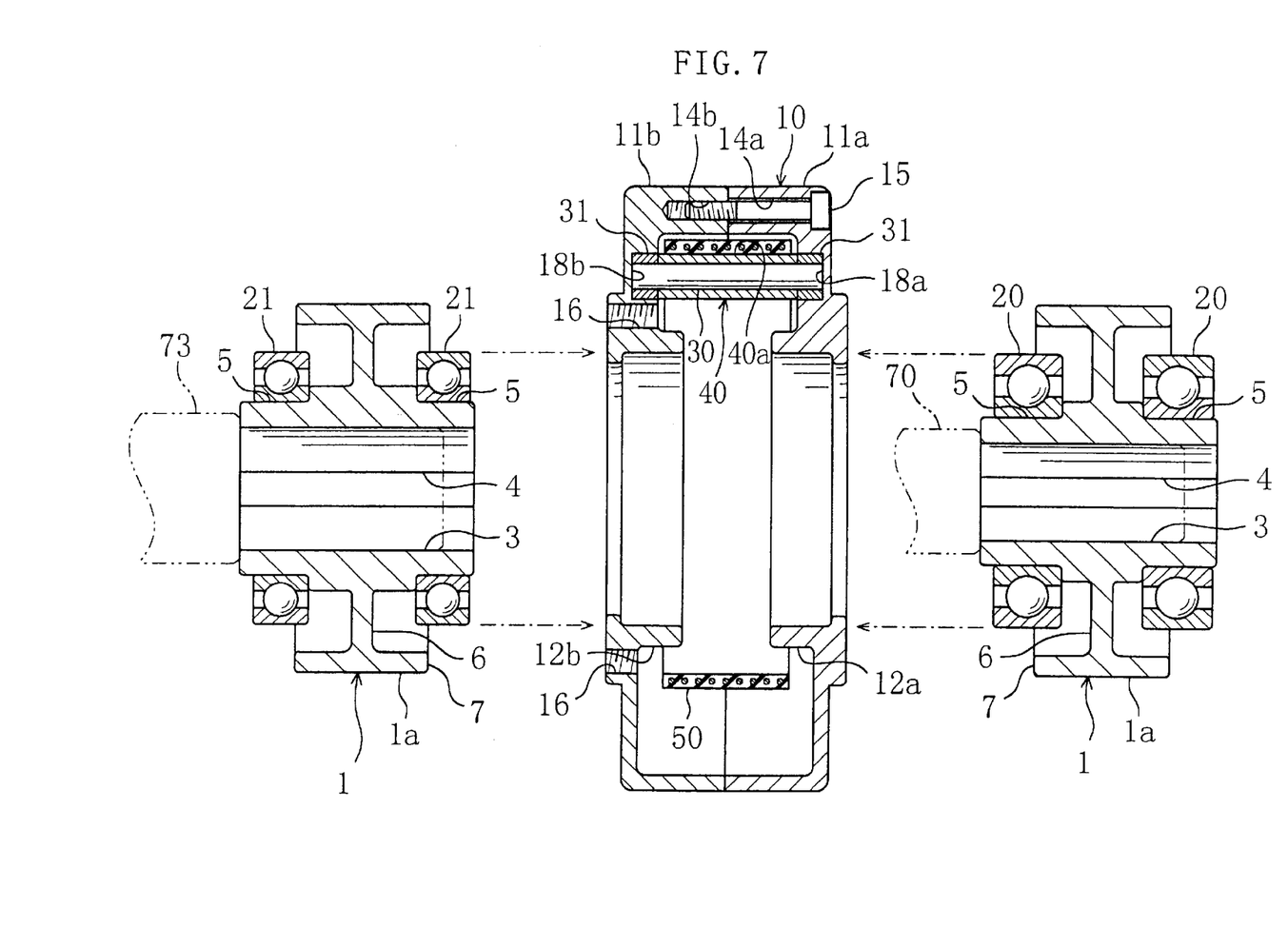
FIG. 7 is a cross-sectional view showing how the first rotation member and bearings are replaced in accordance with the diameter of a drive side output shaft.

Next, with reference to FIG. 7, description will be made about another situation in which the drive side includes an output shaft 73 larger in diameter than the output shaft 70. In this situation, the case 10, the shaft member 30, the rocking member 40, the flat belt 50 and the leaf spring 60 are the same as in the first situation, but only the flat pulley 1 and the bearings 20 are replaced with others. The substitute flat pulley 1 has a coupling hole 3 of the boss 2 larger in hole diameter than that in the first situation, and is arranged so as to fit to the outer diameter of the large-diameter output shaft 73. The seat 5 of the boss 2 is also increased in diameter by an increased inner diameter of the boss 2. Further, the substitute bearing 21 has an outer ring of the same outer diameter as in the first situation, but has an inner ring of larger inner diameter than that in the first situation so as to fit to the outer diameter of the large-diameter seat 5.

Further, in this embodiment, metallic (e.g., iron-made) bushes 31 and 31 as support members which cover the respective side surfaces of ends of the shaft member 30 are pressed into the shaft bores 18a and 18b of the case 10, respectively. The ends of the shaft member 30 are held in the shaft bores 18a and 18b of the case 10 via the bushes 31 and 31, respectively.

As described so far, according to this embodiment, the one-way clutch is arranged so that the case 10 that will be coupled to the driven side via the V-ribbed pulley 80 and the V-ribbed belt 82 is assembled, for rotation around the axis P, with the flat pulley 1 that will be coupled to the drive side output shaft 70, 73, the flat belt 50 is looped between the working surface 40a of the rocking member 40 supported for rocking motion by the shaft member 30 held at their both ends in the shaft bores 18a and 18b of the case 10 and the working surface 1a of the flat pulley 1, and the rocking plate 40 biased by the leaf spring 60 radially outwardly presses one span of the flat belt 50 to place an initial tension on the flat belt 50, wherein both the ends of the shaft member 30 are held in the shaft bores 18a and 18b of the case 10 through the bushes 31 that each cover the side surface of the corresponding end of the shaft member 30. Therefore, load of the shaft member 30 concentrated at the shaft bores 18a and 18b of the case 10 is dispersed so that stress produced within the shaft bores can be suppressed to a low level. This provides transmission of larger torque while avoiding constraints placed on the one-way clutch by using aluminum alloy as material of the case 10 to reduce its weight.

Further, since the bushes 31 are insert molded in the case 10, less efforts for assembly are needed as compared with the case of attaching these bushes 31 following molding of the case 10.

Still further, since the case 10 is formed by molding two halves 11a and 11b with the same die and bonding them together, the manufacturing cost can be reduced as compared with the case of molding the halves with different dies.

Still further, since the rocking member 40 is made by forging, the rocking plate 40 can be strengthened, which contributes to transmission of larger torque and improvement in durability.

Still further, since the working surface 1a of the flat pulley 1 is machined, the frictional force between the working surface 1a of the flat pulley 1 and the flat belt 50 can be reduced. As a result, this embodiment has the advantages of providing smooth blockage of torque transmission due to slide between both the members and of suppressing abrasion of the flat belt 50 that may be induced by such slide.

In the above embodiment, the working surface 1a of the flat pulley 1 is machined. However, machining may be omitted or applied depending upon its necessity.

Further, in the above embodiment, the first rotation member is formed of a flat pulley 1. However, the first rotation member may be adequately designed depending upon conditions required.

Still further, in the above embodiment, the case 10 is made by die casting. However, no special limitations are placed on how to manufacture the case 10.

Still further, in the above embodiment, the case 10 is formed by bonding two halves 11a and 11b in the axial direction. Otherwise, the case may be integrally formed. Even in forming the case by a plurality of pieces, the number of pieces used and the configuration of each piece may be adequately designed as needed.

Still further, in the above embodiment, the case 10 is formed by boding two halves 11a and 11b in the axial direction. Otherwise, the case may be integrally formed. Even in forming the case by a plurality of pieces, the number of pieces used and the configuration of each piece may be adequately designed as needed.

Still further, in the above embodiment, the second rotation member is formed by the case 10. However, no special limitations are placed on the configuration of the second rotation member.

Still further, in the above embodiment, the bushes 31 are insert molded in the case 10. However, the bushes 31 may be pressed into the shaft bores 18a and 18b after the formation of the case 10.

Figure 8:
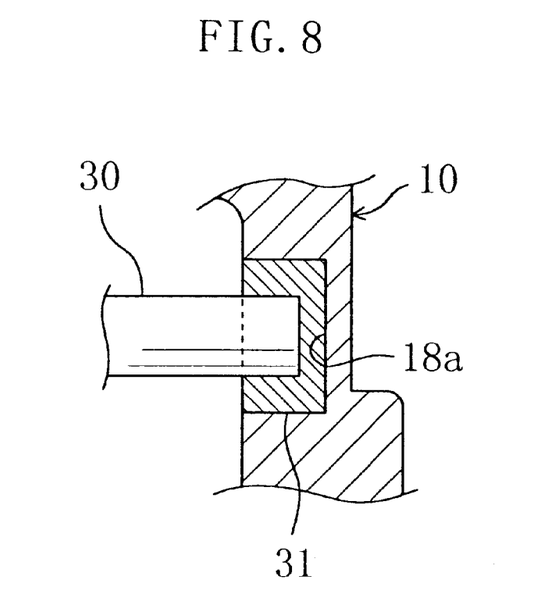
FIG. 8 is a corresponding view of FIG. 1 showing in an enlarged manner a necessary part of a one-way clutch according to another embodiment of the present invention.
Figure 9:
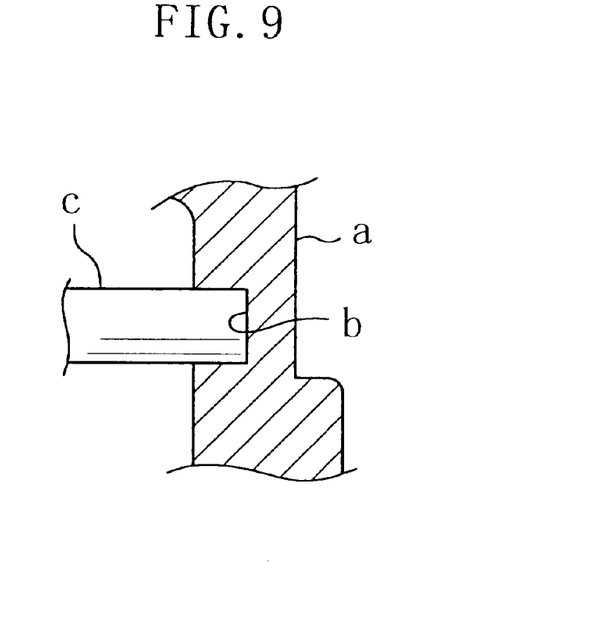
FIG. 9 is a corresponding view of FIG. 1 showing in an enlarged manner a necessary part of a conventional one-way clutch.

Still further, in the above embodiment, the support member is formed of the bush 31 opening at both ends. However, like another embodiment of the present invention as shown in FIG. 8, the support member may be formed of a bottomed cylindrical bush 31.

Still further, in the above embodiment, the rocking plate 40 is made by forging. However, if forging is not needed in terms of strength and durability, the rocking plate may be manufactured by any other method suitable for materials used.

Still further, in the above embodiment, the friction member is formed of a rubber-made flat belt 50. However, the friction member used can be any material, such as metal, enough to have desired tensile strength and flexibility and produce a sufficient frictional force between the friction member and each of the friction surfaces of the first rotation and rocking members.

Still further, in the above embodiment, the leaf spring 60 is used as a biasing member. However, the biasing member may be formed of other suitable members.

Still further, in the above embodiment, the present invention is described with reference to the case of using the one-way clutch for vehicles with a power take-off, rice transplanters or combine harvesters. However, the one-way clutch of the present invention may be used in various kinds of torque transmission paths.

Industrial Applicability

As can be seen from the above, the one-way clutch of the present invention concurrently satisfies the antagonistic requirements of: on one hand, simple construction and low cost without the need of high precision; and on the other hand, light weight and transmission of larger torque. Therefore, the one-way clutch of the present invention is applicable for various kinds of torque transmission paths in a broad range of applications.

What is claimed is:

1. A one-way clutch comprising:

a first rotation member that has a working surface of circular cross section formed in an outer periphery thereof and is coupled to one of drive and driven sides;

a second rotation member that is assembled with the first rotation member so as to rotate around the central axis of the working surface of the first rotation member and is coupled to the other of the drive and driven sides;

a shaft member that is disposed radially outside of the working surface of the first rotation member to extend in parallel with the central axis of the working surface and is held at both ends thereof by the second rotation member;

a rocking member that is placed radially outside of the working surface of the first rotation member, has a working surface of arcuate cross section formed in an outer periphery thereof and is supported for rocking motion on the shaft member;

a friction member that is looped between both the working surfaces of the first rotation member and the rocking member to create two spans between the first rotation member and the rocking member; and a biasing member for tending to rotate the rocking member around the axis of the shaft member so that the rocking member presses one of the spans of the friction member, wherein both the ends of the shaft member are held by the second rotation member through respective support members that each cover side and end surfaces or at least the side surface of the corresponding end of the shaft member on member, wherein both the ends of the shaft member are held by the second rotation member through respective support members that each cover side and end surfaces or at least the side surface of the corresponding end of the shaft member, and wherein the second rotation member is made by die casting, and the support members are insert molded in the second rotation member.

2. The one-way clutch of claim 1, wherein the second rotation member is made from aluminum alloy.

3. The one-way clutch of claim 1, wherein the second rotation member has shaft bores for respectively holding both the ends of the shaft member, and the support members are pressed into the respective shaft bores.

4. The one-way clutch of claim 1, wherein the second rotation member is formed of a first half placed on one side in an axial direction with respect to an imaginary plane which is in the middle of the shaft member and orthogonal to the shaft member, and a second half placed on the other side in the axial direction with respect to the imaginary plane and molded using the same die as used for the first half.

5. The one-way clutch of claim 1, wherein the rocking member is made by forging.

6. The one-way clutch of claim 1, wherein the working surface of the first rotation member is machined.

* * * * *